(No Model.)
J. M. KEEN.
BICYCLE STEP.
No. 561,001. Patented May 26, 1896.
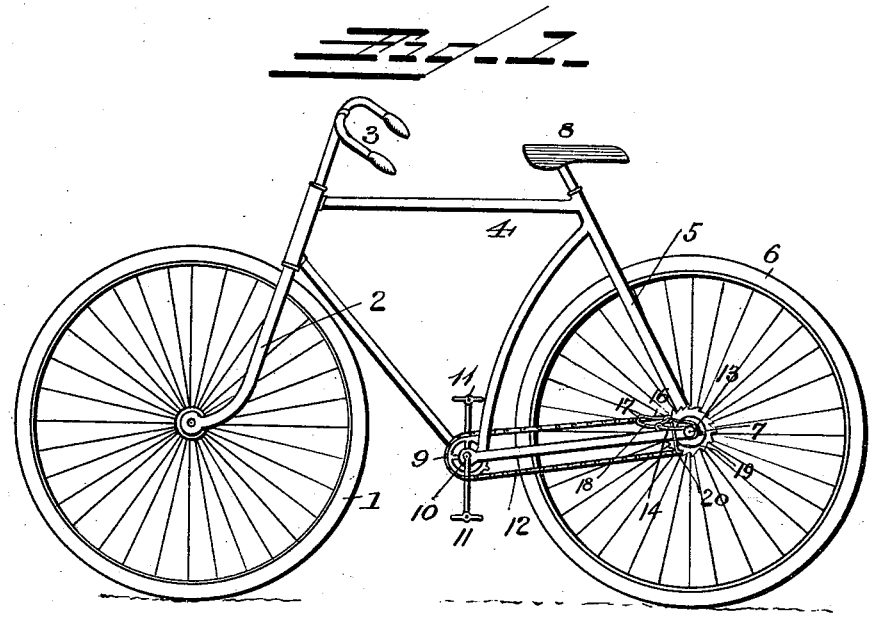
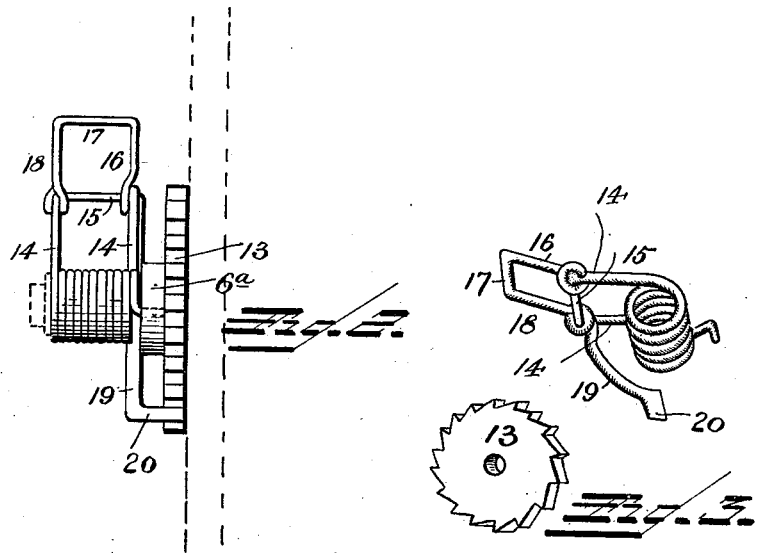
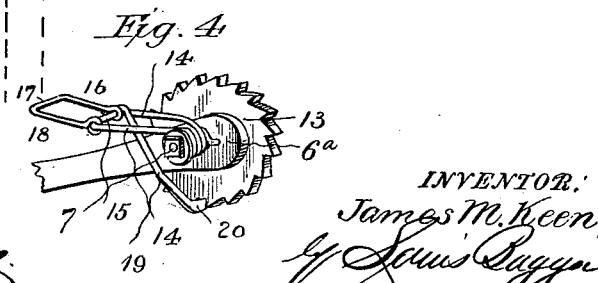
WITNESSES:
INVENTOR:
James M. Keen,
by Louis Bagger & Co.
Attorneys.

UNITED STATES PATENT OFFICE.

JAMES MORAL KEEN, OF DIGBY, CANADA.

BICYCLE-STEP.

SPECIFICATION forming part of Letters Patent No. 561,001, dated May 26, 1896.

Application filed January 20, 1896. Serial No. 576,132. (No model.)

*To all whom it may concern:*

Be it known that I, JAMES MORAL KEEN, a subject of the Queen of Great Britain, and a resident of Digby, in the Province of Nova Scotia and Dominion of Canada, have invented certain new and useful Improvements in Bicycle-Steps; and I do hereby declare that the following is a full, clear, and exact description of the invention, which will enable others skilled in the art to which it appertains to make and use the same, reference being had to the accompanying drawings, which form a part of this specification.

My invention relates to improvements in steps for bicycles; and its object is to provide an improved construction of steps which are pivotally connected with one of the axles of the machine and provided with a lever or pawl adapted to engage with a ratchet-wheel fixed to the wheel on the axle, so that when the step is depressed by a person mounting the bicycle the lever or pawl will rotate the ratchet and supporting-wheel secured thereto to start the machine.

The invention consists in the novel construction and combination of parts hereinafter fully described and claimed.

In the accompanying drawings, Figure 1 is a side elevation of a bicycle provided with my improvement. Fig. 2 is an end view. Fig. 3 is a perspective view of the step detached from the machine. Fig. 4 is a detailed enlarged view of my improvement.

In the said drawings the reference-numeral 1 designates the front wheel of a bicycle; 2, the fork; 3, the handle-bar; 4, the frame; 5, the rear fork; 6, the rear wheel; 7, its shaft or axle; 8, the saddle; 9, the driving-sprocket; 10, the cranks; 11, the pedals, and 12 the sprocket-chain connected with the sprocket, (not shown,) secured to the rear wheel 6. These parts may be of any ordinary or suitable construction and form no part of the present invention. Secured to the wheel 6 on the side opposite the sprocket thereof is a ratchet-wheel 13, with which engages a pawl or lever connected with the step, upon which the rider of the bicycle places his foot in mounting the bicycle. In the present instance this step is shown as being made in two sections, the inner one of which consists of a piece of spring-wire coiled, as shown, to form a sleeve, (see Fig. 3,) which is journaled on a stud $6^a$ above the axle 7, and then extended outwardly and then transversely and then backward, forming arms 14 14 and 15. One of the ends of the wire is secured to the said axle. Pivotally connected with the said arm 15 is the front section of the step, consisting of a piece of wire, one end of which is coiled around said arm and then extended outwardly, forming an arm 16, then transversely, forming an arm 17, and then backwardly, forming an arm 18, which is coiled around the arm 15 and then extended downward and backward, forming a lever or pawl 19, the end of which is bent at a right angle, forming an arm 20, adapted to engage with the said ratchet-wheel. The coils on the arms 16 and 18 are loose on arm 15, so that the latter forms a pivot for the said front section.

The operation is as follows: As the rider steps upon the step preparatory to mounting the bicycle it is depressed by his weight, causing the lever engaged with the ratchet-wheel to be actuated, which will rotate the wheel 6 and start the machine. When the weight is relieved, the pawl or lever will be returned to normal position by the coiled spring encircling the axle 7 of the wheel 6.

I do not wish to limit myself to the details of construction above described, as many different modifications may be made in the step and its construction without departing from the principle of my invention.

The step or toe piece may be provided with a spiral spring, if desired, to throw the lever clear of the ratchet when the pressure of the foot is taken off.

Having thus fully described my invention, what I claim is—

1. The combination with the axle and wheel of a bicycle and the ratchet-wheel secured to said wheel, of the pivoted step and the lever connected therewith engaging with said ratchet-wheel and adapted to rotate the same when the lever is depressed; substantially as described.

2. The combination with the axle and wheel of a bicycle and the ratchet-wheel secured to said wheel, of the pivoted spring-actuated step and the lever connected therewith engaging with said ratchet-wheel and adapted to rotate the same when the step is depressed; substantially as described.

3. The combination with the axle and the wheel of a bicycle and the ratchet-wheel secured to said wheel, of the step-sections comprising the coiled wire, the lateral and transverse arms and one end of said wire pivoted to a stud above the said axle, the front sections consisting of a piece of wire bent to form lateral and transverse arms and the lateral arms coiled around the transverse arm of the said coil and one of said arms extended to form a lever or pawl having its end bent at an angle and engaging with the ratchet-wheel; substantially as described.

In testimony that I claim the foregoing as my own I have hereunto affixed my signature in presence of two witnesses.

JAMES MORAL KEEN.

Witnesses:
GEORGE APPLETON ROBINSON,
ROBERT GORDON MONROE.